(12) United States Patent
Götte et al.

(10) Patent No.: US 10,507,911 B2
(45) Date of Patent: Dec. 17, 2019

(54) CONTROL ROD FOR ADJUSTING A ROTOR BLADE OF A HELICOPTER

(71) Applicant: ZF Friedrichshafen AG, Friedrichshafen (DE)

(72) Inventors: Jürgen Götte, Vellmar (DE); Andre Hausberg, Kassel (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/743,375

(22) PCT Filed: Jun. 16, 2016

(86) PCT No.: PCT/EP2016/063818
§ 371 (c)(1),
(2) Date: Jan. 10, 2018

(87) PCT Pub. No.: WO2017/008983
PCT Pub. Date: Jan. 19, 2017

(65) Prior Publication Data
US 2018/0201368 A1 Jul. 19, 2018

(30) Foreign Application Priority Data
Jul. 15, 2015 (DE) .......................... 10 2015 213 226

(51) Int. Cl.
*F16C 7/06* (2006.01)
*B64C 27/68* (2006.01)
(Continued)

(52) U.S. Cl.
CPC .............. *B64C 27/68* (2013.01); *B64C 27/54* (2013.01); *B64C 27/605* (2013.01); *F16C 7/06* (2013.01); *G01D 5/04* (2013.01)

(58) Field of Classification Search
CPC .. F16C 7/02; F16C 7/023; F16C 7/026; F16C 7/04; F16C 7/06; F16C 7/08; F16C 9/04;
(Continued)

(56) References Cited

U.S. PATENT DOCUMENTS

| 4,498,842 | A | * | 2/1985 | Fischer | ................... B64C 27/54 |
| | | | | | 416/155 |
| 5,511,944 | A | * | 4/1996 | Ide | .......................... B64C 27/72 |
| | | | | | 244/17.13 |
| 2007/0166162 | A1 | | 7/2007 | Podgurski | |

FOREIGN PATENT DOCUMENTS

DE       3225571 A1   1/1984
DE  10 2009 001393 A1   9/2010
(Continued)

OTHER PUBLICATIONS

Machine Translation of EP 1,050,693, obtained Jun. 28, 2019.*
(Continued)

*Primary Examiner* — Richard W Ridley
*Assistant Examiner* — Brian J McGovern
(74) *Attorney, Agent, or Firm* — Brinks Gilson & Lione (57) ABSTRACT

The invention relates to a control rod for the adjusting of a helicopter rotor blade, wherein the control rod can be adjusted in longitudinal direction, comprising: at least one contact area element, at least one limit stop element, which is designed to limit the adjustability of the control rod in longitudinal direction to a specifiable adjusting range in interrelation with the at least one contact area element, wherein the limit stop element can be transferred from a first position to a second position, wherein the at least one stop element limits the adjustability of the control rod in the first position and enables the adjustability of the control rod beyond the specifiable adjusting range in the second position.

12 Claims, 11 Drawing Sheets

(51) Int. Cl.
*B64C 27/54* (2006.01)
*B64C 27/605* (2006.01)
*G01D 5/04* (2006.01)

(58) Field of Classification Search
CPC ...... F16C 9/06; F16C 9/02; F16C 3/14; F16C 3/06; F16J 1/16; B64C 27/54; B64C 27/605; B64C 27/59; F04B 39/0022; F04B 39/14; F01M 2001/062; F01M 1/06
See application file for complete search history.

(56) References Cited

FOREIGN PATENT DOCUMENTS

| | | | |
|---|---|---|---|
| DE | 20 2011 110665 U1 | 6/2015 | |
| EP | 1050693 A1 * | 11/2000 | ............. F01D 25/28 |
| FR | 2 529 861 A1 | 1/1984 | |

OTHER PUBLICATIONS

International Search Report and Written Opinion (in German) for International PCT Application No. PCT/EP2016/063818, dated Aug. 23, 2016, pp. 11 pages.
International Search Report (English translation) for International PCT Application No. PCT/EP2016/063818, dated Aug. 23, 2016, 2 pages.
German Search Report dated Jun. 7, 2016 for German Patent Application No. 10 2015 213 226.9 (9 pages).
English translation of p. 9 of German Search Report dated Jun. 7, 2016 for German Patent Application No. 10 2015 213 226.9 (2 pages).

* cited by examiner

CONTROL ROD FOR ADJUSTING A ROTOR BLADE OF A HELICOPTER

RELATED APPLICATIONS

This application is a filing under 35 U.S.C. § 371 of International Patent Application PCT/EP2016/063818, filed Jun. 16, 2016, and claims the priority of German Patent Application DE 10 2015 213 226.9, filed Jul. 15, 2015, both of which are incorporated by reference herein in their entirety.

BACKGROUND

1. Technical Field

The invention relates to a control rod for the adjusting of a helicopter rotor blade, wherein the control rod is adjustable in longitudinal direction, comprising at least one contacting area element, at least one limit stop element, which is designed to limit the adjustability of the control rod in longitudinal direction to a specifiable adjusting range in interrelation with the at least one contacting area element.

2. Background Information

A control rod arrangement for the adjusting of rotor blades is known from the DE102009001393A1. The control rod arrangement for the adjusting of helicopter rotor blades, which is described in there, comprises one control rod with two bearing eyes that are provided on two end-sides and an adjusting range, which is arranged between the bearing eyes, wherein the adjusting range is also known as lift or lifting range. On the end that is on the rotor blade side, the control rod is connected to the rotor blade via the one bearing eye, and on its other end that is on the swash plate side, it is connected to a swash plate via the other bearing eye. The distance between the two bearing eyes can be adjusted during flight via the adjusting range, that can be adjusted in longitudinal direction by means of a drive that is arranged within the adjusting range. For the longitudinal adjusting of the control rod in the known control rod arrangement, an electric motor and a gear wheel are provided as drive. It is furthermore possible to adjust the individual control rods in their longitudinal direction for an initial/default setting. The initial/default setting is carried out in regular intervals and exclusively on the ground with standing rotor. For the mechanical initial/default setting of the control rod, a locking nut is loosened and a securing ring, which is located below, is raised. A thereby accessible gearing of the spindle nut can then be adjusted by means of a gear wrench in a grid of the gearing.

The therein described control rod makes it possible to individually adjust a helicopter rotor blade during flight. By means of this procedure that is known as in-flight tuning, it is possible to continuously reduce vibrations, which are caused by an imbalance of the blades, depending on a given flight situation. The disadvantage of this arrangement is, that the therein described limit stops for the limiting of the lift or for a regulating of the adjusting range can become severely strained by external forces and by forces issuing from the spindle drive, when the spindle nut rests on or runs against the respective limit stop. Another disadvantage is that a mechanism for the initial/default setting of the control rod is extremely complex, has to be operated manually and is prone to error.

BRIEF SUMMARY

It is the objective of the invention to remove the disadvantages of the prior art and to particularly present a control rod of the previously mentioned kind, in which the initial/default setting of the control rod can be carried out in a simplified and faster manner. Also, a plurality of components is to be reduced, making the control rod lighter and more cost effective. Another aspect of the invention is to provide a procedure for an initial/default setting.

In accordance with the invention, this will be accomplished in that at least one limit stop element can be transferred from a first position to a second position, wherein the stop element limits the adjustability of the control rod in the first position, and allows the adjustability of the control rod beyond the specifiable adjusting range in the second position.

Within the meaning of this invention, a limit stop element is understood to be a physical element, which is designed to limit the rotation of another physical element, in particular to limit the contact area element around a longitudinal axis of the control rod. To accomplish this, the limit stop element can be arranged and designed in such a way with regard to the rotatable contact area element, that it is particularly non-rotatable, in order to absorb forces and/or torques of the turning or rotating contact area element and to e.g. [sic=use ", for example," instead?] dissipate these into adjacent components.

Within the meaning of this invention, a contact area element is understood to be a physical element, which is designed to come to rest at the at least one limit stop element. It hereby features a particular area, which at least partly overlaps in circumferential direction radially with the limit stop element and which is designed to introduce the forces and/or torques, that were caused by the rotation, into the limit stop element in circumferential direction.

Within the meaning of this invention, the term "interrelation" means in particular, that the contact area element with the at least one limit stop element can be brought into contact, in order to limit the adjusting of the control rod.

The control rod may comprise a first support element, which is arranged coaxially towards it and which can be rotated around its longitudinal axis, with at least one protrusion which is extending in longitudinal direction of the control rod and which is interrupted in circumferential direction, wherein this protrusion forms the contact area element, wherein a first contact area can be arranged at a first end and a second contact area at the essentially opposite second end of the first protrusion. The contact area element, which is designed in form of a protrusion, also known as cam or shoulder, can be constructed in a simple manner and is very compact in size. It is furthermore possible that the contact area element is connected to a drive element, which can adjust the control rod in the longitudinal direction.

It is e.g. possible that a limit stop element, which is realized in form of a threaded bolt or a limit stop screw, can be transferred from a first position to a second position or vice versa. The threaded bolt can be inserted in the first position. In the second position, into which the threaded bolt can be transferred by being pulled out, it is possible that the threaded bolt enables the rotation beyond the lifting range, because it cannot interact with the contact area element for the limiting of the lifting range in the second position, i.e. it cannot limit the adjusting of the control rod. An initial/default setting of the control rod can thus be carried out, which can be done on the ground with a standing rotor. The initial/default setting can e.g. be carried out by means of an electric motor, so that in an advantageous way, a manual operation can be omitted. In the initial/default setting, the control rod is adjusted within a range of up to 40 millimeters (mm) in longitudinal direction. It can thus be said that a rough adjustment of the control rod is being carried out.

An adjusting of the control rod in longitudinal direction for the reduction of vibrations during flight, which is also called in-fight tuning, can be limited in that the at least one contact area element comes to rest at the at least one limit stop element in circumferential direction of the control rod. This means, that the contact area element can rotate with a radial distance from the longitudinal axis in one of the two rotation directions around the longitudinal axis, in particular until the contact area element it turned all the way towards the limit stop element, so that it comes to rest on the stop element and the stop element prevents any further rotation. It is e.g. possible that the contact area element is attached to a drive element or that it is integrally configured together with it, which is designed in order to move the control rod in longitudinal direction. Thereby, the control rod is very compact in size, light in weight and inexpensive, because an existing drive element can be used for an additional function. In order to change the specifiable adjusting range or lifting range, the at least one limit stop element can be adjusted in circumferential direction of the control rod. The adjustability during flight thus have the purpose of a fine tuning so to speak —in contrast to the rough adjustment, and ranges in a magnitude of up to 1.5 millimeters. It has been observed that the effect of the interrelation between the contact area element and the limit stop element in circumferential direction causes much smaller forces that issue on the limit stop element than e.g. the effect of the interrelation of the control rod which acts between the contact area element and the limit stop element in longitudinal direction. It has furthermore been observed that it is possible to limit both, an extension as well as a shortening of the control rod in longitudinal direction for the in-flight tuning with only one single limit stop element.

It has furthermore been established that it is possible to limit the adjusting range as well as to adjust the initial/default setting with one limit stop element that can be moved between two positions.

In a preferred embodiment, it can be provided, that at least one limit stop element is a threaded bolt or a stop screw, which is designed in such a way, that its longitudinal axis is aligned mainly perpendicular to the longitudinal axis of the control rod, wherein the at least one threaded bolt can be transferred in radial direction, in particular from the radial inner side towards the radial outer side, from the first position to the second position. In addition to this, it is preferred that this at least one limit stop element is a threaded bolt that can be inserted into a corresponding opening, in particular into a bore-hole of a control rod housing. It is furthermore preferred that the limit stop element can be transferred from a first state into a second state, wherein the stop element limits the adjustability of the control rod in the first state, and enables the adjustability of the control rod beyond the specifiable adjusting range in the second state.

The threaded bolt or the stop screw can e.g. be screwed into an opening, in particular into a bore-hole of a control rod housing. If the threaded bolt is screwed in, it is located in the first position, in which the adjustability is limited. If the threaded bolt is screwed out, it is located in the second position, which enables the adjustability within the adjusting range. Other axis angles are also possible. A limit stop element that is constructed in form of a threaded bolt or stop screw is very simple in construction and inexpensive in production.

If the construction space makes it impossible to move the at least one limit stop element along the circumference of the control rod, because e.g. peripheral devices are arranged there, the changing of the adjusting range can advantageously be realized by means of a second support element, which is also referred to as a stop ring. A second protrusion, which is also known as cam or shoulder or the like, will thereby assume the function of the limit stop element. The stop ring is preferably mounted in such a way that it can be rotated around the longitudinal axis and can comprise several recesses that are distributed around the circumference. In order to fix or secure the stop ring, the means for securing it, e.g. a securing bolt, is introduced through an opening in the control rod housing into one of the recesses of the stop ring, so that the stop ring is rotatably fixed to the control rod housing via the securing bolt.

Therefore, it is a further aspect of this invention to provide a control rod for the adjusting of a helicopter rotor blade, wherein the control rod can be adjusted in longitudinal direction, comprising: at least one contact area element, at least one limit stop element, which is designed to limit the adjustability of the control rod in longitudinal direction to a specifiable adjusting range in interrelation with the at least one contact area element, wherein the limit stop element can be transferred from a first state into a second state, wherein the at least one stop element limits the adjustability of the control rod in the first state and enables the adjustability of the control rod beyond the specifiable adjusting range in the second state.

It is particularly preferred that the control rod comprises a first support element, which is arranged coaxially towards it and which can be rotated around its longitudinal axis, with at least one protrusion which is extending in longitudinal direction of the control rod and which is interrupted in circumferential direction, wherein this protrusion forms the contact area element, and that the at least one limit stop element is arranged on at least one second support element which is arranged in a coaxial manner towards the control rod, wherein the limit stop element is formed by means of a second protrusion which extends in longitudinal direction of the control rod, wherein the limit stop element is connected to the control rod housing in the first state, by means of which the adjustability of the control rod is being limited in the first state, and wherein this connection is released in the second state, by means of which the adjustability is enabled beyond the specifiable adjusting range.

It is e.g. possible to transfer the limit stop elements, which are designed in form a stop rings, from a first state into a second state and vice versa. In the first state, the stop ring is secured e.g. against rotation, for example by means of a securing bolt, it is thus fixed. The stop ring is thus also connected to the control rod housing. In the second state, the securing bolt is released or removed, i.e. the connection is released, by means of which the stop ring can e.g. be rotated. During the initial/default setting, it is e.g. possible that the contact area element, which is formed as a shoulder, turns the limit stop element, which is formed as a shoulder, and thus also the stop ring beyond the specifiable adjusting range, or in other words: to drag it along.

Moreover, it is preferred that the control rod is electrically adjustable in longitudinal direction by means of an actuator.

It is especially preferred, if the actuator for the adjusting of the control rod includes a spindle drive or the like, wherein a spindle of the spindle drive is drivable via a gear stage of a planetary gear set, which is driven by an electric motor, and wherein the spindle for the adjusting of the control rod moves a spindle nut axially and wherein the spindle is the driving element.

The spindle drive is preferably designed in such a way, that it covers the required adjusting range of the control rod in its entirety. However, other drives can also be used.

It is furthermore preferred, if the at least one contact area element is connected to one gear wheel of the gear stage in such a way that it is rotationally fixed, wherein the gear wheel is connected to the spindle of the spindle drive. But it is also possible that the gear wheel and the spindle are formed in an integral manner. Due to the rotationally fixed coupling of the contact area element to the gear stage, a direct transmission of the force and/or torque to the at least one limit stop element is possible.

It is particularly preferred if the at least one contact area element is made in an integral manner, i.e. in one piece with one gear wheel of the gear stage, wherein the gear wheel is connected to the spindle of the spindle drive. It is also possible that all three components are formed in an integral manner. It is also preferred that the actuator is can be operated in dependence of setpoint values and of actual positions as well as by means of sensor signals, i.e. that it can be regulated and/or controlled. A control and/or regulating system can determine setpoint values by means of actual positions and sensors. An operating condition of the system can be represented by a display.

In the context of another preferred embodiment of the invention, it can be intended that the at least one limit stop element is adjustable in circumferential direction of the control rod in order to change the adjusting range. Thus, it is possible to increase or decrease the adjusting range depending on the requirement. It is thus possible to shift one of e.g. two limit stop elements, which allow for a turning range of e.g. 210° in circumferential direction, in such a way, that a larger turning range, e.g. 300° or a smaller turning range, e.g. 180°, can be achieved. Thus, with only one component, in particular one limit stop element, it is possible to implement both, the adjusting range limitation as well as the initial/default setting, which leads to a significant reduction of components, mechanical simplification and cost reduction.

Another aspect of the invention is to provide a procedure, in particular a procedure for the adjusting of a control rod in longitudinal direction, wherein the control rod comprises at least one contact area element, at least one limit stop element, which is designed to limit the adjustability of the control rod in longitudinal direction to a specifiable adjusting range in interrelation with the at least one contact area element, comprising these steps:
  transferring of the at least one limit stop element from a first position P1 to a second position P2 or transferring of the at least one limit stop element from a first stage Z1 into a second stage Z2 in a first step 110 at a certain point in time t1,
  transferring of the control rod from a first length L1 to a second length L2 in a second step 120 at a point in time t2,
  transferring of the at least one limit stop element from the second position to the first position or transferring of the at least one limit stop element from the second stage into the first stage in a third step 110 at a certain point in time t3, wherein t1<t2<t3.

In addition, a procedure is preferred in which the transferring is carried out by means of an electric motor in the second step 120 and the transferring in the first step 110 and third step 130 is carried out manually.

The procedure enables a quicker and more accurate adjusting than what is known from the prior art, in which the adjusting is carried out manually.

BRIEF DESCRIPTION OF THE DRAWINGS

In the following, the present invention is explained further with reference to the drawings. It is shown.

DETAILED DESCRIPTION OF THE DRAWINGS AND THE PRESENTLY PREFERRED EMBODIMENTS

Figure 1:
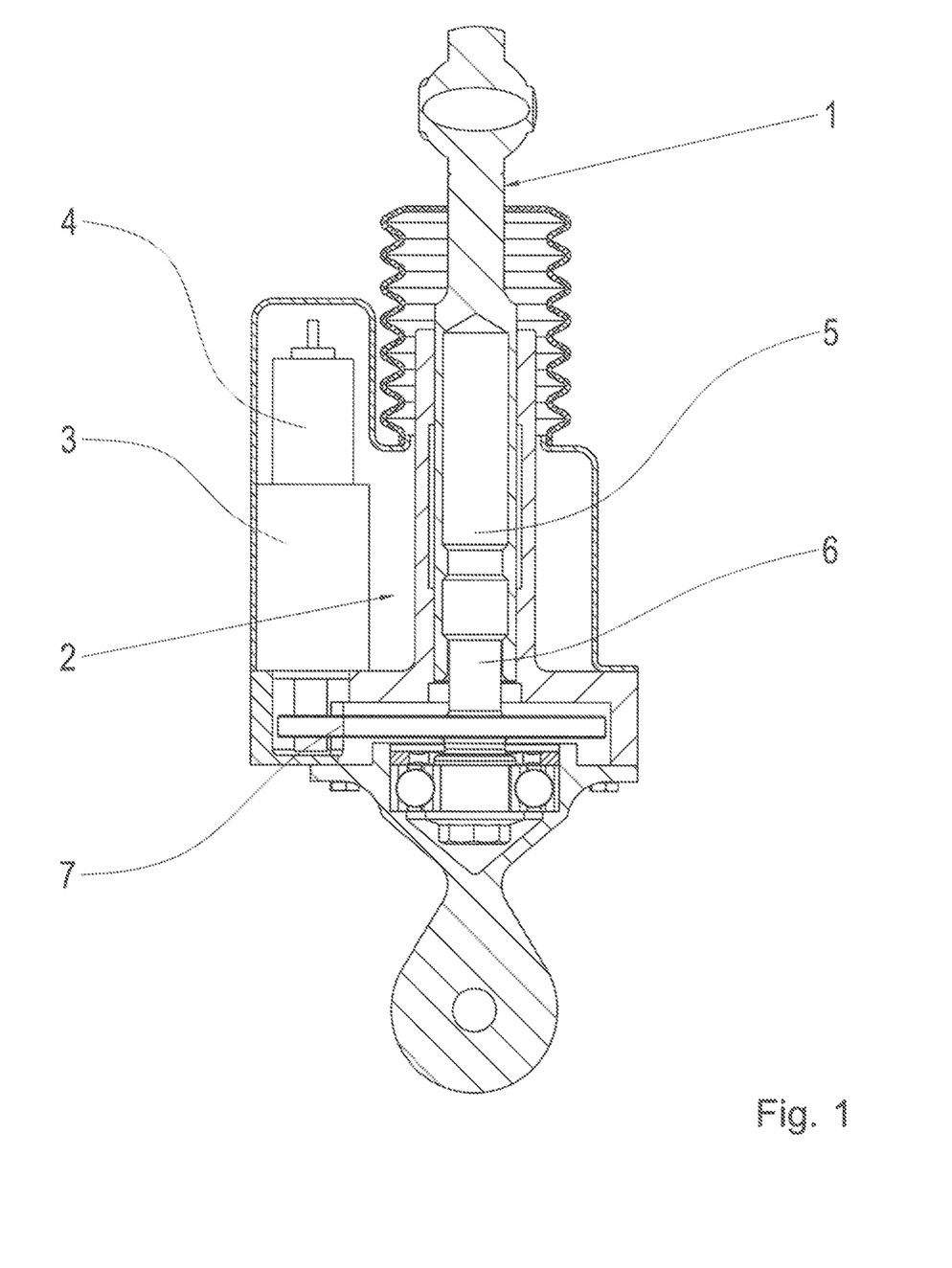
FIG. 1 is a cross-sectional, three-dimensional depiction of a control rod according to the invention.

A control rod according to the invention for the adjusting of a helicopter rotor blade comprises in a generally well-known manner a bearing seat at its one rotor blade-sided end and a bearing seat at the other end on the motor-side. Control rod 1 is designed in such a way that it is adjustable in longitudinal direction within a specified adjusting range. For the adjusting of the control rod, control rod 1 comprises at least one actuator 2, which includes a spindle drive that is driven via a planetary gear 3 by means of an electric motor 4. The spindle drive includes a spindle nut 5 which is connected to control rod 1, which is moves axially by means of a spindle 6. Spindle 6 is driven via a gear wheel or spur wheel stage 7, which is driven via the planetary gear 3 by means of electric motor 4. A detailed depiction of the adjusting of the control rod is shown particularly in FIG. 1.

In line with the invention, it is intended that the adjusting range, which is specified by means of the at least one limit stop element, is adjustable, an interrelation between the stop element, which limits the rotating or turning range of spindle 6, and the rotating spindle 6 in circumferential direction is carried out and an initial/default setting of the control rod can be performed quickly and almost error-free.

Figure 2:
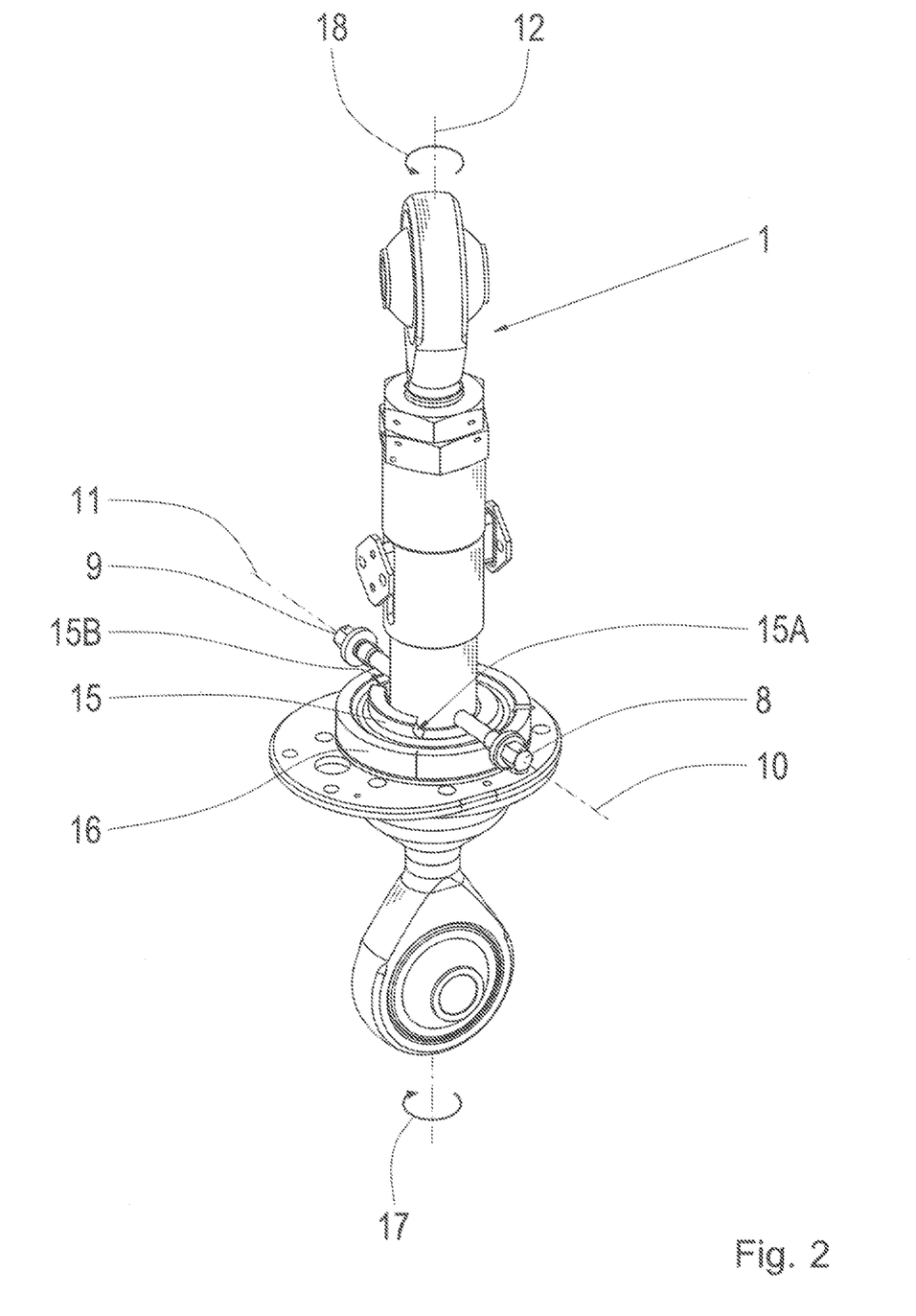
FIG. 2 is a three-dimensional depiction of a preferred first embodiment.
Figure 9:
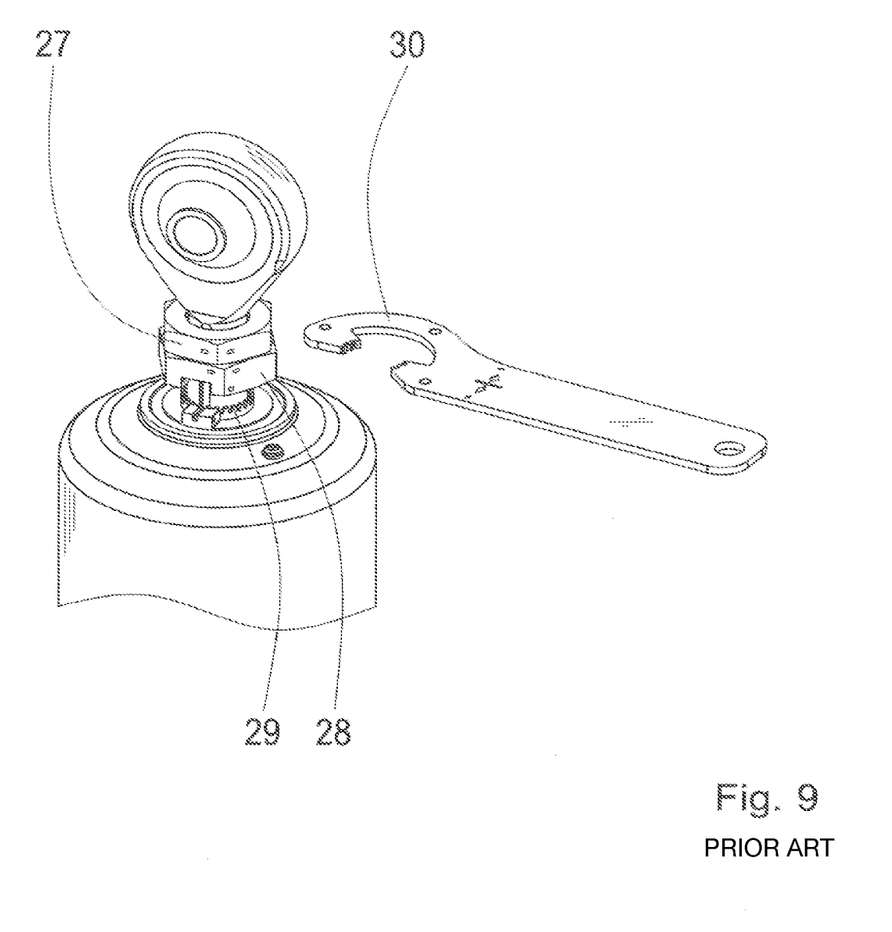
FIG. 9 shows a three-dimensional view of the prior art.
Figure 10:
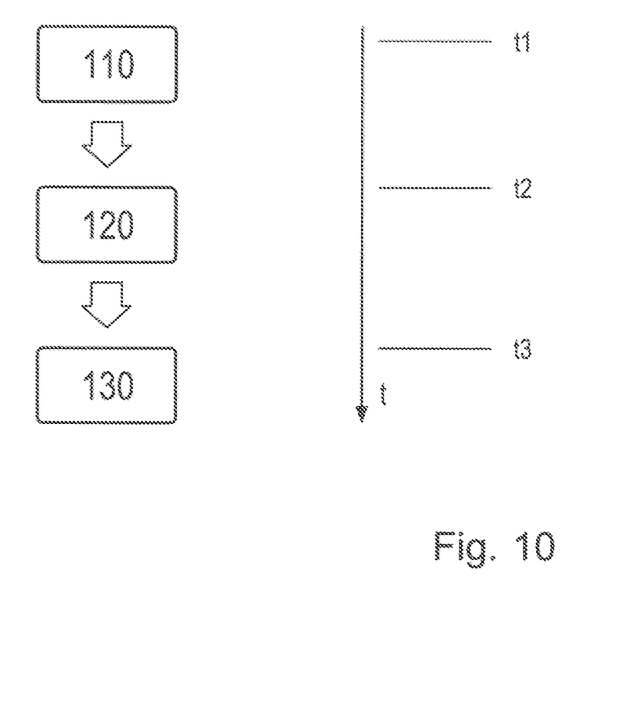
FIG. 10 shows a depiction of a first embodiment of a process according to the invention.
Figure 11:
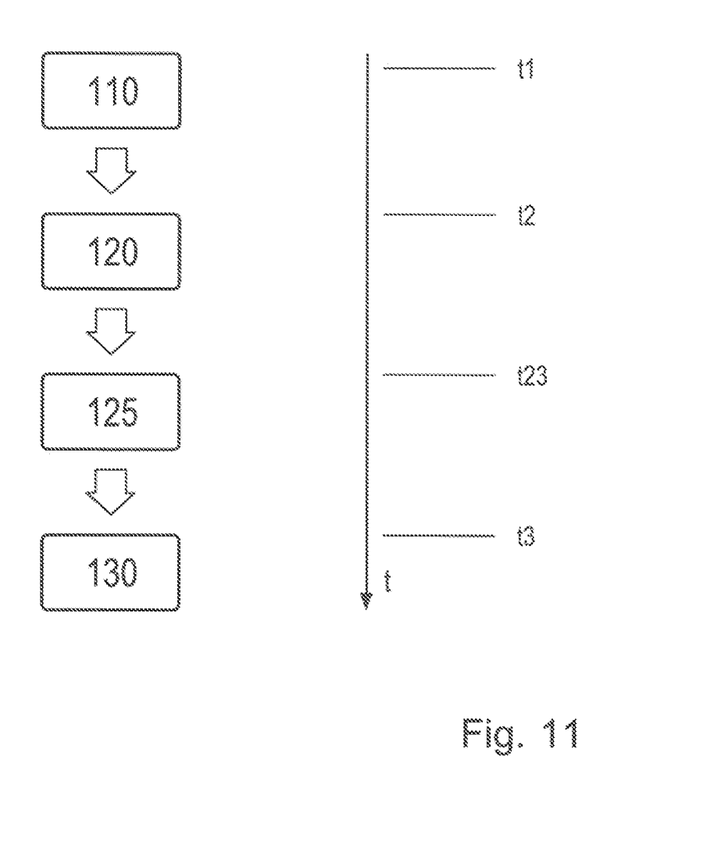
FIG. 11 shows a depiction of a second embodiment of a process according to the invention.

How this is achieved, is shown by the FIGS. 2 to 6, wherein FIG. 2 depicts a preferred embodiment with a limit stop element 8, 9, which is implemented as a threaded bolt, and the FIGS. 3 to 8 depict a further preferred embodiment with a limit stop element 8, 9 which is implemented as a shoulder. FIGS. 9 through 11 depict the prior art.

In FIG. 2, a preferred first embodiment is depicted. The rotating or turning range of the not depicted spindle 6 is limited by means of two stop elements 8, 9 which are implemented as threaded bolts. The respective longitudinal axes 10, 11 of the threaded bolts 8, 9 intersect a longitudinal axis 12 of control rod 1 in a perpendicular manner, respectively. The two threaded bolts 8, 9 are arranged on opposite sides with regard to the longitudinal axis 12 of control rod 1, so that the two longitudinal axes 10,11 form a common axis. Several housing bore-holes 14, which are distributed along the circumference are provided in a not depicted control rod housing 13. These can accommodate the threaded bolts 8, 9. In the inserted state, the threaded bolts 8, 9 do not come into contact with spindle 6. Control rod 1 furthermore features a contact area element 15 which is formed as a cam or shoulder, which is connected to the first support element that is prepared as gear wheel 16 of the gear stage 7. Gear wheel 16 in turn is rotationally fixed to spindle 6. It is also possible that it is formed in an integral manner along with spindle 6. If spindle 6 is rotated counterclockwise 18 with regard to the longitudinal adjustment, then shoulder 15 comes in contact with a first contact area 15A at the first threaded bolt 8. In the opposite rotation direction 17, shoulder 15 comes in contact with a second contact area 15B at the second threaded bolt 9. Shoulder 15 is formed together with the gear wheel 16 of the gear stage 7 in an integral manner, or in one single piece. The rotating range of spindle 6 that is depicted in FIG. 2 amounts to approx. 150° in circumferential direction, when taking into consideration the expansion of shoulder 15 and of the threaded bolts 8, 9. In order to change the adjusting range, one of the threaded bolts 8 or 9, or both threaded bolts 8, 9 can be removed from the respective housing bore-hole 14 and can be inserted into another housing bore-hole 14. Thus, if one of the threaded bolts 8, 9 would be removed, the adjusting range can be varied to a rotating range of the spindle 6 that is between approx. 15° and approx. 345°. It is clear to an expert, that the varying cannot be carried out infinitely, but that it is in particular dependence on the amount of, and the diameter of the housing bore-holes 14.

The threaded bolts 8, 9 are situated in the first position P1. If the initial/default setting is to be carried out, the threaded bolts 8, 9 are transferred from the first position P1 to a second position P2 by being unscrewed. Shoulder 15, which is driven by means of spindle 6, can now be rotated beyond the formerly specified adjusting range in order to carry out a new rough adjusting of the control rod in longitudinal direction. Once the desired length has been reached, the threaded bolts 8, 9 are transferred from the second position to the first position by being screwed into a desired housing bore-hole 14.

Figure 3:
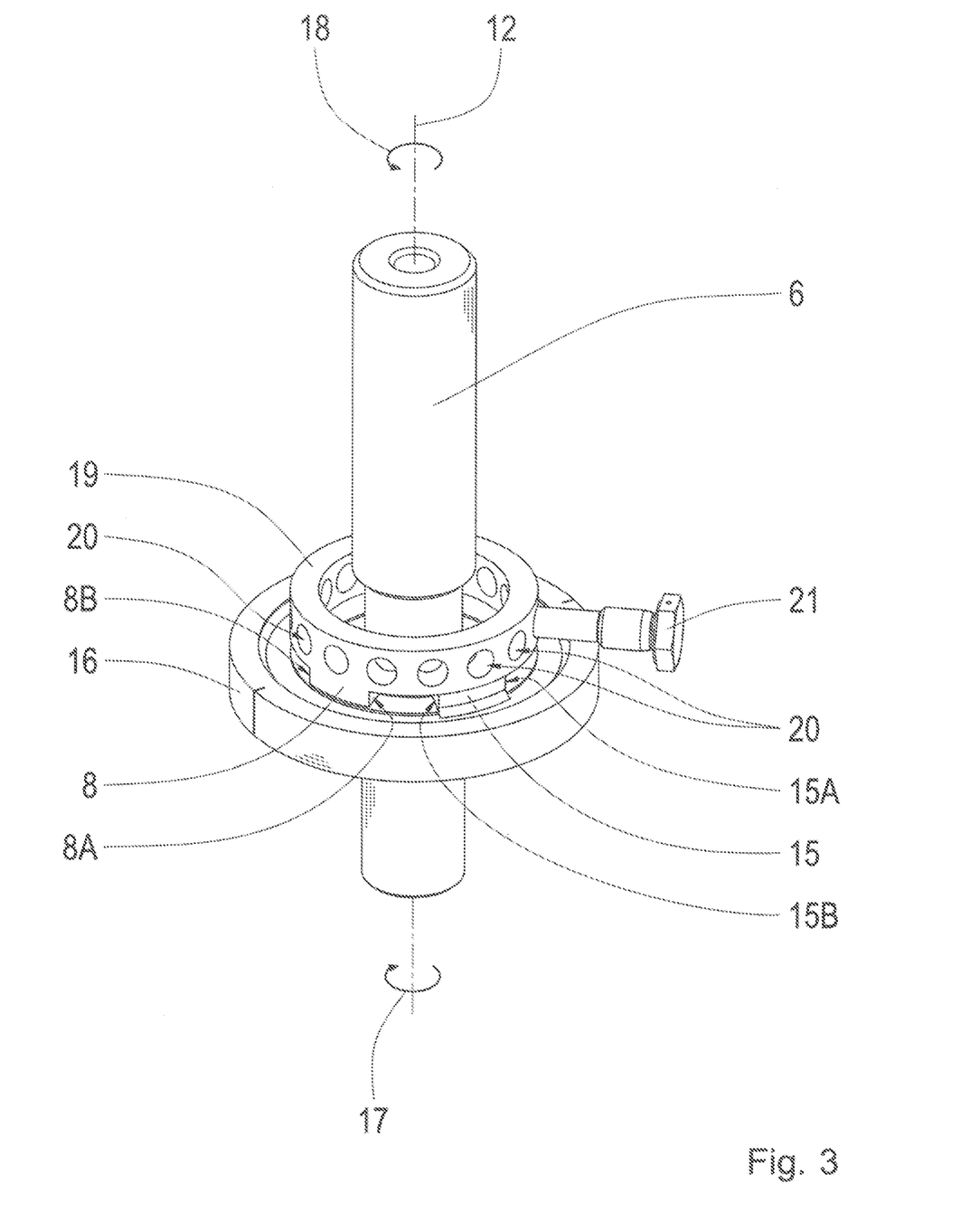
FIG. 3 is a three-dimensional depiction of a preferred second embodiment.

FIG. 3 shows another preferred embodiment. A first limit stop element 8, which is formed as a cam or shoulder and which extends in longitudinal direction, is thus provided, which is integrally arranged at a second support element, which is formed as a limit stop ring 19 and which features two contact areas 8A, 8B. Limit stop ring 19 is rotatably arranged in a coaxial way with regard to spindle 6 and is guided by a not depicted guide element, which is arranged within the control rod housing 13. In order to secure limit stop ring 19 in its place, a locking means 21, which is designed in form of a securing bolt, is inserted into a bore-hole 14 which is arranged within the not depicted housing 13 and into one of the several bore-holes 20 which are arranged along the circumference of the limit stop ring 19. If spindle 6 is rotated counterclockwise 18 for a longitudinal adjustment, then shoulder 15 with its contact area 15A comes to rest at cam 8. In the opposite rotation direction 17, shoulder 15 with its contact area 15B comes to rest at cam 8. If the respective expansion of the shoulders 8, 15 is subtracted in circumferential direction, a counterclockwise 18 rotation of approx. 335°, and a clockwise 17 rotation of approx. 5° of spindle 6 is possible according to FIG. 3. The angular section is thus determined by the expansion of the respective shoulders 8, 15 in circumferential direction. In order to change this adjusting range, securing bolt 21 is removed from bore-hole 14 and 20. Limit stop ring 19 with the shoulder 8 can now be rotated around axis 12, and the adjusting range can be newly adjusted. In order to secure limit stop ring 19, a selected bore-hole 20 is brought into alignment with the housing bore-hole 14, and securing bolt 21 is inserted. Limit stop ring 19 is secured, so that shoulder 8 is situated in a first state Z1. If the initial/default setting is to be carried out, shoulder 8 is transferred from the first state Z1 into a second state Z2 in that securing bolt 21 is removed from the respective bore-holes 14, 20. Shoulder 15, which is driven by means of spindle 6, can now be rotated beyond the formerly specified adjusting range in order to carry out a new rough adjusting of the control rod in longitudinal direction. Hereby, shoulder 15 drags shoulder 8 along in the rotation direction 17, 18. Once the desired length has been reached, securing bolt 21 is inserted into bore-hole 14 and into a corresponding bore-hole 20.

Figure 4:
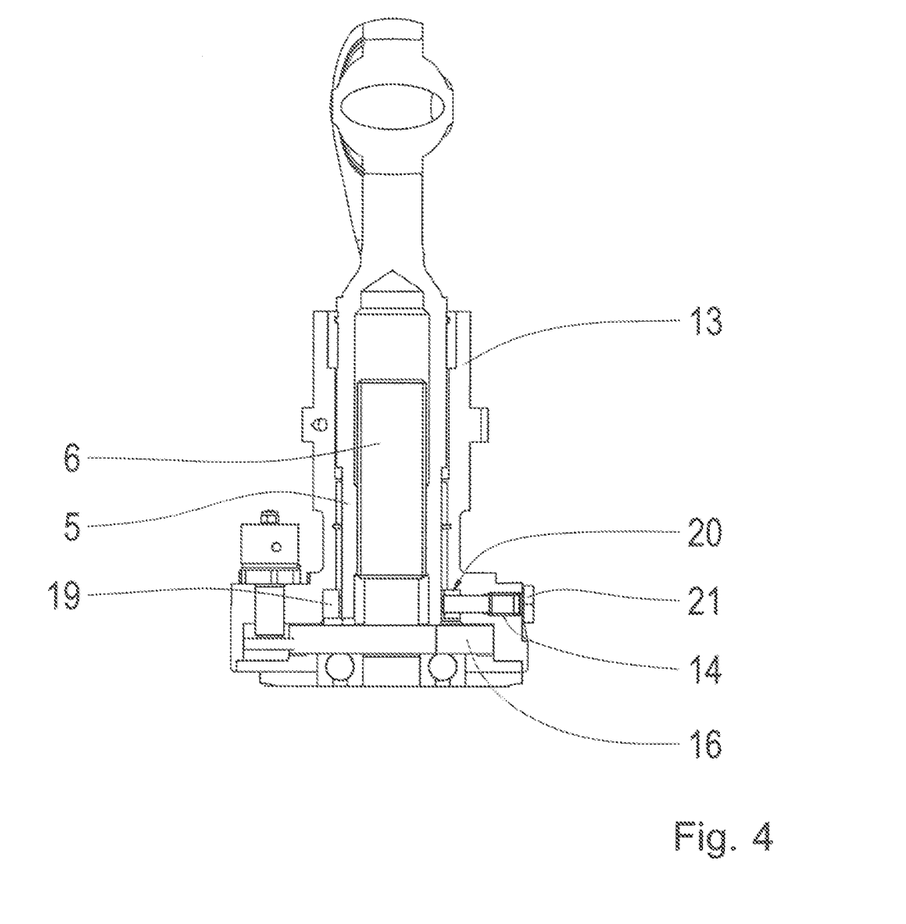
FIG. 4 is the preferred embodiment of FIG. 3 in a longitudinal section.

FIG. 4 shows the preferred embodiment of FIG. 3 in a further depiction. It can be seen that securing bolt 21 is inserted through the housing bore-hole 14 into a bore-hole 20. Thus, the rotating or turning range of spindle 6 is limited to an angular section of approx. 330°. As it can be furthermore recognized, securing bolt 21 does not come into contact with spindle nut 5, nor with spindle 6.

Figure 5:
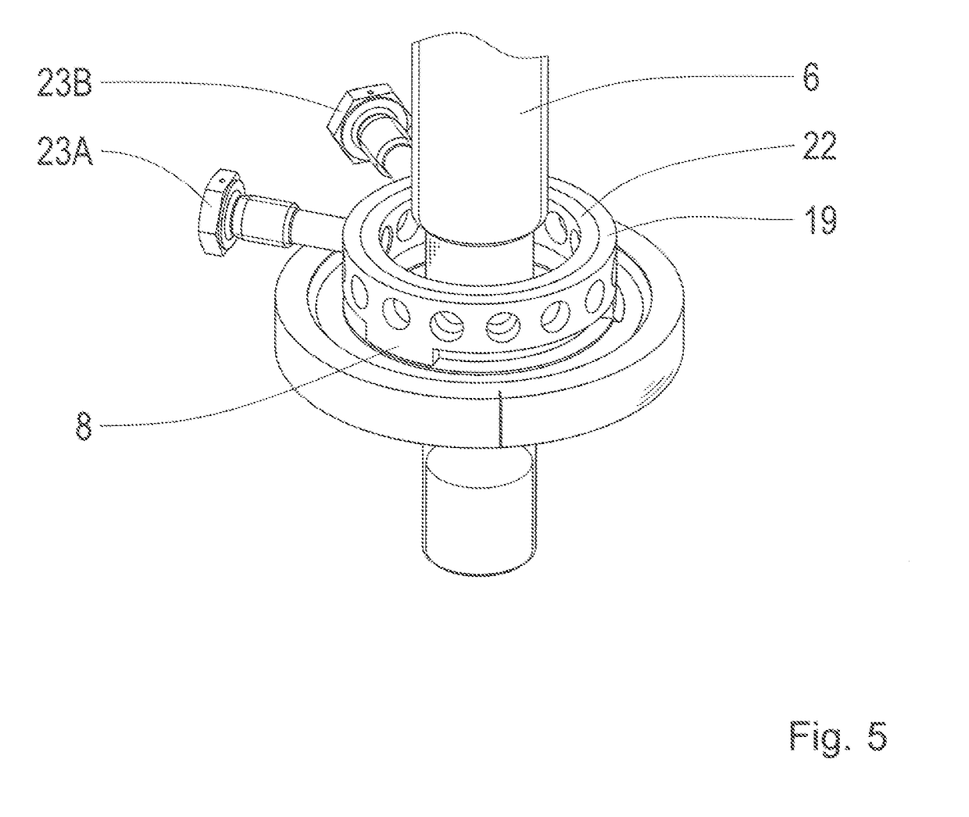
FIG. 5 is a three-dimensional depiction of a preferred third embodiment.

FIG. 5 shows another preferred embodiment. In contrast to FIG. 3 and FIG. 4, a not depicted second limit stop element 9, which extends in longitudinal direction, is intended in addition to the first limit stop element 8, which is integrally arranged at a third support element, which is formed as a limit stop ring 22, wherein limit stop ring 22 is aligned in a coaxial manner with regards to spindle 6 and is arranged radially rotatable between spindle 6 and limit stop ring 19. Shoulders 8 and 9 define an adjustable angular section, in which the not depicted shoulder 15 can be turned for an adjusting in longitudinal direction of control rod 1. A different adjusting range or lift can be set by means of the second limit stop ring 22. Compared to FIG. 3, it is particularly possible to set a smaller lift. The lifting range of control rod 1, as it is depicted in FIG. 5, amounts to approx. 200°. The limit stop rings 19 and 22 are both secured against turning by means of a securing bolt 23A or 23B. It is also possible to secure both limit stop rings with one single securing bolt.

Limit stop rings 19, 22 are secured, so that the shoulders 8, 9 are situated in a first state Z 1. If the initial/default setting is to be carried out, shoulders 8, 9 are transferred from the first state Z1 into a second state Z2 in that securing bolts 23A, 23B are removed from the corresponding bore-holes 14, 20, respectively. Shoulder 15, which is driven by means of spindle 6, can now be rotated beyond the formerly specified adjusting range in order to carry out a new rough adjusting of the control rod in longitudinal direction. Hereby, shoulder 15 drags the shoulders 8, 9 along in the rotation direction 17, 18. Once the desired length has been reached, the securing bolts 23A, 23B are inserted into the respective bore-hole 14 and into a corresponding bore-hole 20, respectively.

Figure 6:
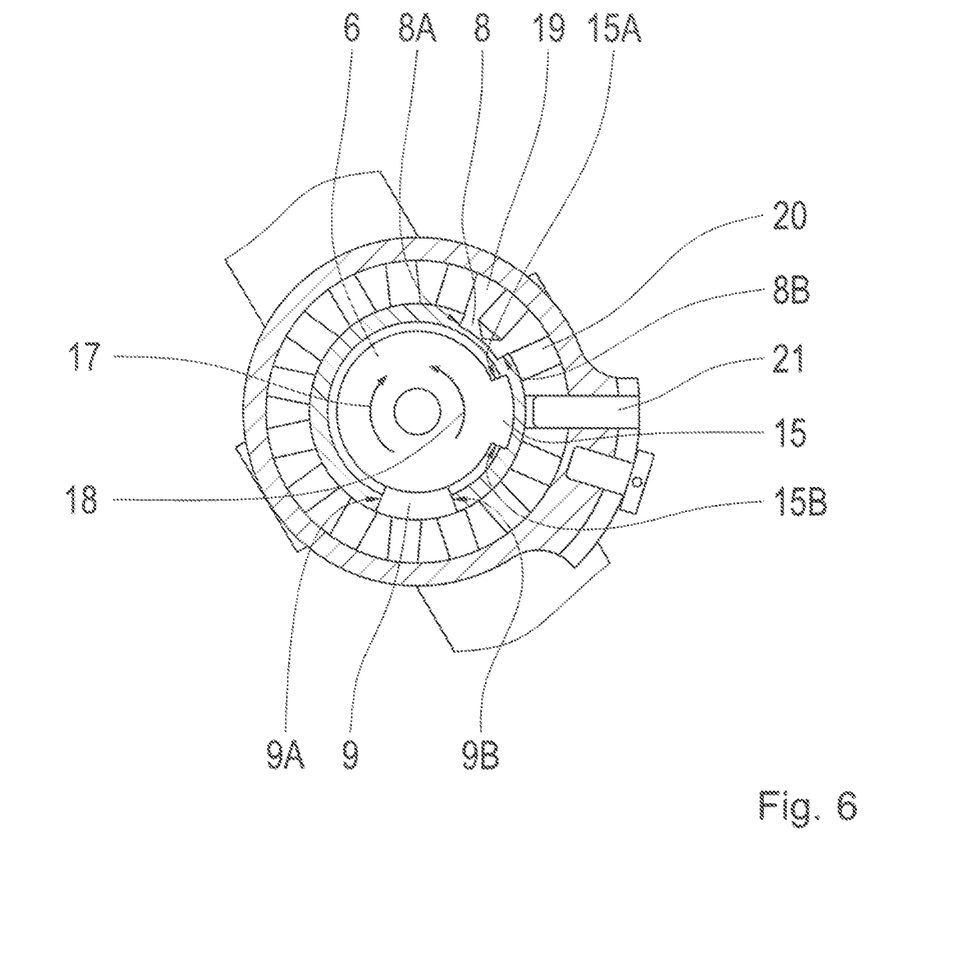
FIG. 6 is a preferred fourth embodiment in cross-section.

FIG. 6 shows another preferred embodiment. Limit stop 19 with its shoulder 8 is secured against turning by means of securing bolt 21. Limit stop ring 22 with its shoulder 9 on the other hand, is not secured against rotation. The shoulder 15 of spindle 6 and the shoulder 8 of limit stop ring 19 do not feature any mutually overlapping sections in radial direction, which means that shoulder 15 is set at a radial distance to shoulder 8, so that an extension of the adjusting range or of the lift beyond one spindle rotation is possible. If shoulder 15 is turned in one of the two rotation directions 17, 18 for an adjusting of control rod 1 in longitudinal direction, then shoulder 15, with its first or second contact area 15A or 15B, drags along shoulder 9 of the not depicted and not fixed limit stop ring 22 in circumferential direction until a first contact area 8A or a second contact area 8B of shoulder 8 has been reached, and until shoulder 15 presses shoulder 9 against the fixed shoulder 8. The particular advantage of the embodiment illustrated in FIG. 6 is, that spindle 6 can be rotated beyond one spindle rotation in order to adjust the control rod in longitudinal direction. The lifting range of control rod 1 as it is depicted in FIG. 6, amounts to approx. 630°.

If the spindle 6 in FIG. 6 with the shoulder 15 is e.g. turned clockwise 17, shoulder 15 will turn until its contact area 15B comes to rest on a limit stop section 9B of shoulder 9. Shoulder 15 drags the not secured shoulder 9 along in rotation direction until a limit stop section 9A of shoulder 9 comes to rest on the limit stop section 8A of the fixed shoulder 8.

If the spindle 6 in FIG. 6 with the shoulder 15 is e.g. turned counterclockwise 18, shoulder 15 will initially rotate past shoulder 8 without touching it, until shoulder 15 with its contact area 15A comes to rest on a limit stop section 9A of shoulder 9. Shoulder 15 drags the not secured shoulder 9 along in rotation direction until the limit stop section 9B of shoulder 9 comes to rest on the limit stop section 8B of the fixed shoulder.

The initial/default setting of the control rod in FIG. 6 behaves in a corresponding manner with regard to FIGS. 4 and 5.

Figure 7:
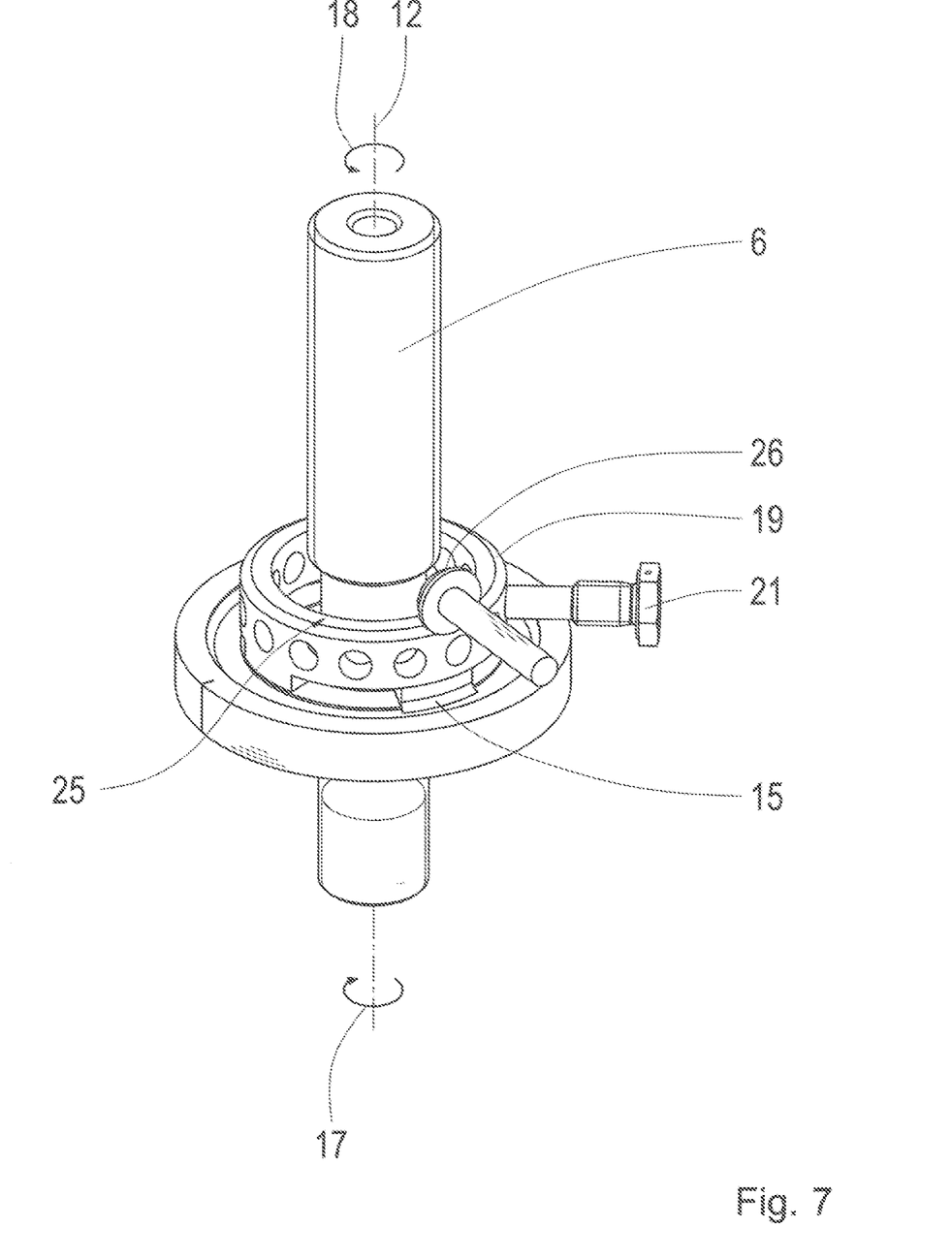
FIG. 7 is an illustrative apparatus for the adjusting of the limit stop element.

FIG. 7 illustrates how limit stop ring 19 can be adjusted by means of a bevel gearbox. For this purpose, limit stop ring 19 features a gear tooth system 25 on an upper side and thus acts as a crown gear. For the setting of the adjusting range, a first operating device 26 which is formed as a bevel pinion is guided through a bore-hole 14 in the housing and placed and secured on gear tooth system 25, so that the pinion 26 is engaged with the gear tooth system 25 of limit stop ring 19. Now securing bolt 21 of limit stop ring 19 is removed and by means of a turning of pinion 26, limit stop ring 19 is rotated into one of two directions 17, 18. Pinion 26 is powered by an electric motor. But it is also possible to adjust it manually. Once the adjusting range is set, limit stop ring 19 is held in position by means of the securing bolt 21 and operating device 26 is removed. The axis angle between pinion 26 and limit stop ring 19, as it is depicted in FIG. 7, amounts to 90°. But other axis angles are also possible, in particular axis angles ranging between 0° and 135°.

Figure 8:
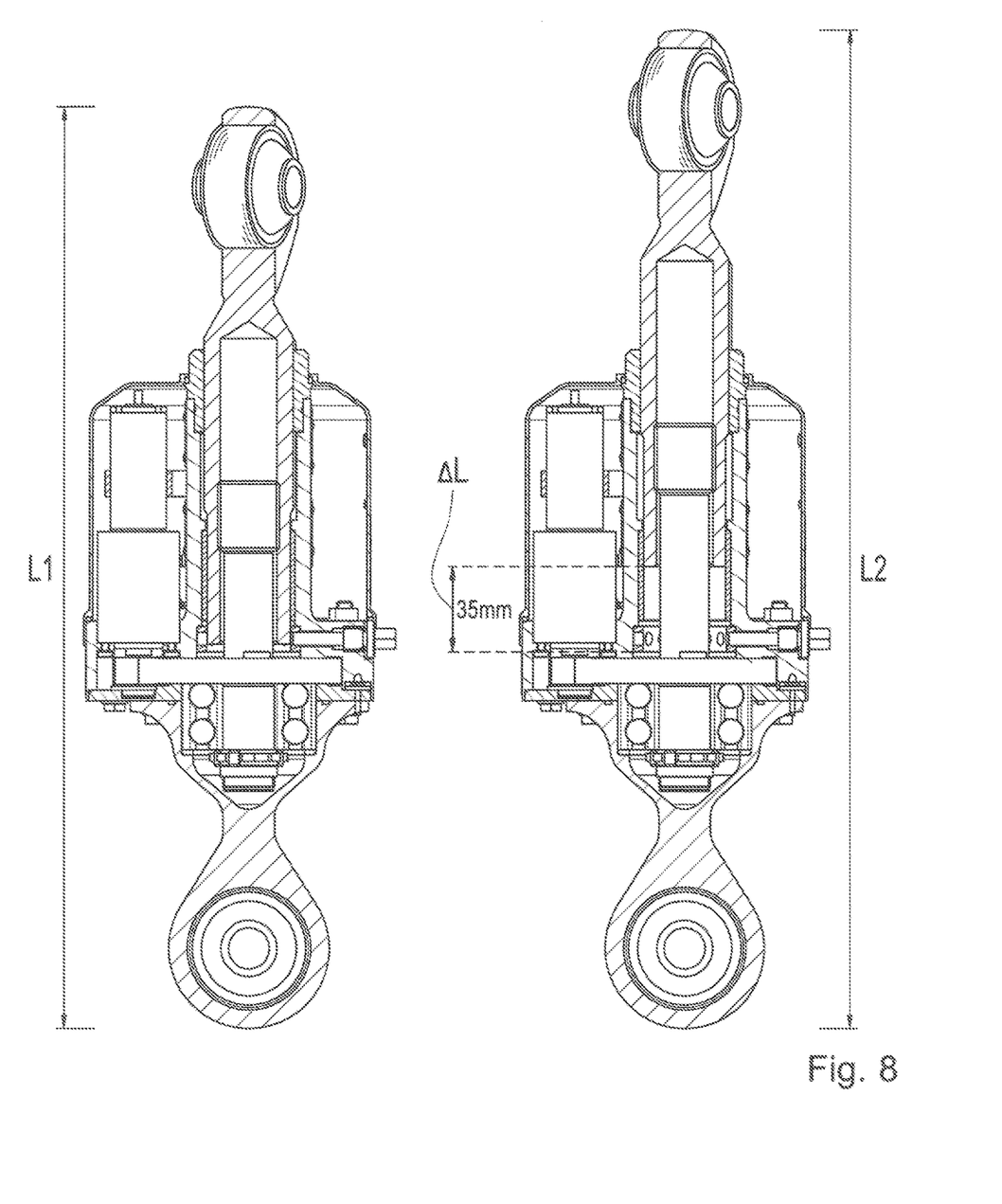
FIG. 8 shows a cross-sectional, three-dimensional view of a longitudinal adjustment of a control rod according to the invention.

FIG. 8 illustrates a maximum longitudinal adjustment of control rod 1. In the left image, control rod 1 features a length L1. In the right image, control rod features a length L2. The difference ΔL amounts to 35 mm.

FIG. 9 depicts the prior art. In accordance with the prior art, a locking nut 27 is manually loosened for the mechanical adjusting of the length, and a securing ring 28 is manually raised. A thereby accessible gearing 29 of spindle nut 5 can then be adjusted by means of a corresponding gear wrench 30 in a grid of the gearing 29. The rotation by one sprocket is defined as 1 DET. With the help of markers on a guide bushing and on the spindle nut, it is possible to determine and control the number of DET that were adjusted. If the adjusting range is insufficient, an upper rod end has to be hung out and the upper rod end has to be turned in or out by one respective rotation. After the adjustment, the adjustment limits must be checked. It turns out that this prior art is mechanically too complicated. It has furthermore been observed that the adjusting for the initial/default setting consumes a lot of time.

FIG. 10 depicts an exemplified process of the procedure for the initial/default setting according to the invention. In FIG. 10, at least one limit stop element 8, 9 which is realized in form of a threaded bolt, is initially transferred from a first position P1 to a second position P2 in a first step 110 at a point in time t1. This means that it is unscrewed so far towards the radial outside or fully unscrewed, so that the spindle with the contact area element 15 is freely rotatable. In a second step 120 which is subsequent in time t2, the control rod is transferred from a first length L1, amounting to 295 mm, to a second length L2, amounting to 330 mm, and is thus extended by 35 mm. Of course, a shortening of the control rod is also possible. Also, other lengths are imaginable. In a third step 130 which is subsequent in time t3, the at least one threaded bolt 8, 9 is transferred from the second position to the first position of P1. It is thus screwed into a housing bore-hole 14 from the radial outside towards the radial inside. The threaded bolt is now secured again and limits an adjusting range.

FIG. 11 depicts another exemplified process of the procedure for the initial/default setting according to the invention. In FIG. 11, a limit stop element, which is realized in form of a shoulder 8 that is arranged at a limit stop ring 19, is first of all transferred from a first position P1 to a second position P2 in a first step 110 at a point in time t1. This means that securing bolt 21 is at least partially unscrewed from a bore-hole 14, 20 so that the spindle with the contact area element 15 is freely rotatable. In a second step 120 which is subsequent in time t2, the control rod is transferred from a first length L1, amounting to 295 mm, to a second length L2, amounting to 330 mm, and is thus extended by 35 mm. Of course, a shortening of the control rod is also possible. Other lengths are also imaginable. In a third step 130 which is subsequent in time t3, the limit stop ring 19 with the shoulder 8 is secured again, i.e. it is transferred from the second stage Z2 into the first stage Z1. This is accomplished in that securing bolt 21 is inserted into the housing bore-hole 14 and into a bore-hole 20 of the limit stop ring 19, which is aligned to it. In particular for this purpose, an additional step 125 would be imaginable, or a step that is placed chronologically between the second and third step 120, 130, wherein a bore-hole 20 of the limit stop ring 19 is brought into alignment with the housing bore-hole 14 at a point in time t23.

For the skilled person it is furthermore clear, that the procedures of FIGS. 10 and 11 only represent exemplified procedures according to the invention. Of course, further steps for the initial/default setting are possible.

LIST OF REFERENCE SIGNS

1. Control rod
2. Actuator
3. Planetary gearbox
4. Electric motor
5. Spindle nut
6. Spindle
7. Gear wheel/spur gear stage
8. First stop element, threaded bolt, cam, shoulder 8 A, B First and second limit stop section of the first limit stop element
9. Second stop element, threaded bolt, cam, shoulder
9 A, B Limit stop sections of the second limit stop element
10. Longitudinal axis of the threaded bolt 8
11. Longitudinal axis of the threaded bolt 9
12. Longitudinal axis of the control rod
13. Control rod housing
14. Recess, housing bore-hole
15. Contact area element, cam, shoulder
15 A, B First and second limit stop section of the contact area element
16. First support element, gear wheel
17. Rotation direction clockwise
18. Rotation direction counterclockwise
19. Limit stop ring
20. Recess, bore-holes on limit stop ring 19
21. Means to secure limit stop ring 19, securing bolt
22. Second limit stop ring
23 A, B Means for securing, securing bolt
24 Upper side
25 Gear tooth system
26 Operating device, bevel pinion
27 Securing nut
28 Securing ring
29 Gear tooth system
30 Gear wrench
P1, P2 First, second position
Z1, Z2 First, second state
L1, L2 First, second length
t1, t2, t3, t23 Points in time

What is claimed is:

1. A control rod for adjusting a helicopter rotor blade, wherein the control rod is adjustable along a longitudinal axis of the control rod, the control rod comprising:
   at least one contact area element; and
   at least one limit stop element having a fixed state and a movable state relative to a housing;
   in the fixed state, a bolt is inserted through the housing and into a hole in the at least one limit stop element to fix the at least one limit stop element to the housing and the at least one limit stop element cooperates with the at least one contact area element to limit adjustability of the control rod along the longitudinal axis of the control rod to a specifiable adjusting range;
   in the movable state, the bolt is removed from the hole in the at least one limit stop element to allow the at least one limit stop element to rotate around the longitudinal axis from a first position to a second position to adjust the specifiable adjusting range.

2. The control rod of claim 1, further comprising:
   a first support element coaxially arranged around the longitudinal axis of the control rod and configured to be rotatable around the longitudinal axis of the control rod;
   wherein the at least one contact area element comprises at least one protrusion that extends along the longitudinal axis of the control rod and is interrupted in a circumferential direction; and
   wherein the at least one limit stop element is coaxially arranged around the longitudinal axis of the control rod;
   wherein the at least one limit stop element comprises a second protrusion that extends along the longitudinal axis of the control rod.

3. The control rod of claim 2, wherein the control rod is electrically adjustable along the longitudinal axis via an actuator.

4. The control rod of claim 1, wherein the control rod is electrically adjustable along the longitudinal axis via an actuator.

5. The control rod of claim 4, wherein the actuator for the adjusting of the control rod comprises a spindle drive comprising a spindle and a spindle nut;
   wherein the spindle is drivable via a gear stage of a planetary gear,
   wherein the planetary gear is driven by an electric motor; and
   wherein the spindle for the adjusting of the control rod moves the spindle nut along the longitudinal axis.

6. The control rod of claim 5, wherein the at least one contact area element is connected to a gear wheel of the gear stage to prevent rotation of the contact area element relative to the gear wheel.

7. The control rod of claim 6, wherein the actuator can be operated as a function of setpoint values, actual positions, and sensor signals.

8. The control rod of claim 5, wherein the at least one contact area element is made in an integral manner with a gear wheel of the gear stage.

9. The control rod of claim 8, wherein the actuator can be operated as a function of setpoint values, actual positions, and sensor signals.

10. The control rod of claim 5, wherein the actuator can be operated as a function of setpoint values, actual positions, and sensor signals.

11. The control rod of claim 4, wherein the actuator can be operated as a function of setpoint values, actual positions, and sensor signals.

12. The control rod of claim 1, wherein the bolt further comprises at least one of a threaded bolt and a screw.

* * * * *